United States Patent [19]
Hassan

[11] 3,857,149
[45] Dec. 31, 1974

[54] METHOD OF MAKING A BALL JOINT
[75] Inventor: Morris Hassan, Trenton, N.J.
[73] Assignee: Chrysler Corporation, Highland Park, Mich.
[22] Filed: Dec. 3, 1973
[21] Appl. No.: 421,309

Related U.S. Application Data
[62] Division of Ser. No. 303,728, Nov. 6, 1972.

[52] U.S. Cl. .......................................... 29/149.5 B
[51] Int. Cl. .......................................... B23p 11/00
[58] Field of Search . 29/149.5 B, 148.4 R, 149.5 R; 287/87, 90; 308/72

[56] References Cited
UNITED STATES PATENTS
2,823,055 2/1958 Booth ........................... 29/149.5 B
3,061,344 10/1962 Gray et al. .................... 29/149.5 B

*Primary Examiner*—Thomas H. Eager
*Attorney, Agent, or Firm*—Talburtt & Baldwin

[57] ABSTRACT

Method of making ball joint suspension apparatus of the type including an upper control arm and lower control arm connected by ball joints to a steering knuckle. One ball joint assembly includes a stud having a ball on one end mounted in a socket. A pressure plate, biased by a resilient member engages the ball and keeps it in contact with the socket as the socket and ball wear. The method includes placing a retainer in the socket a predetermined distance from a specified point on the ball to limit the amount of movement of the pressure plate.

2 Claims, 7 Drawing Figures

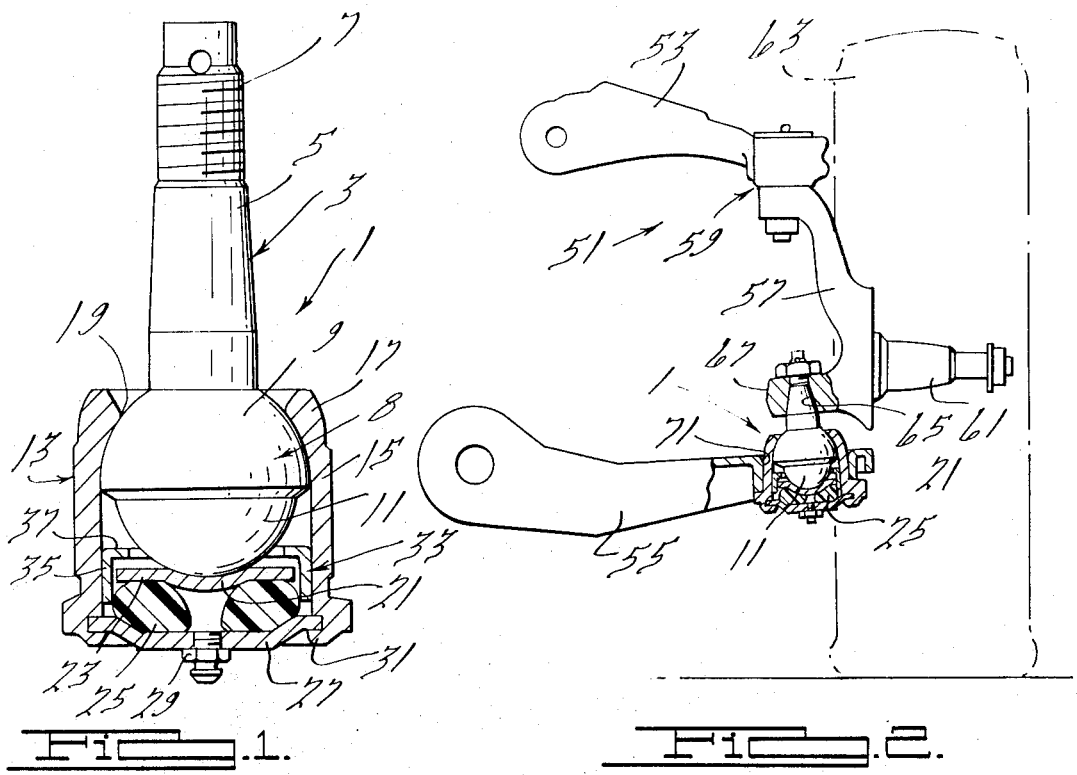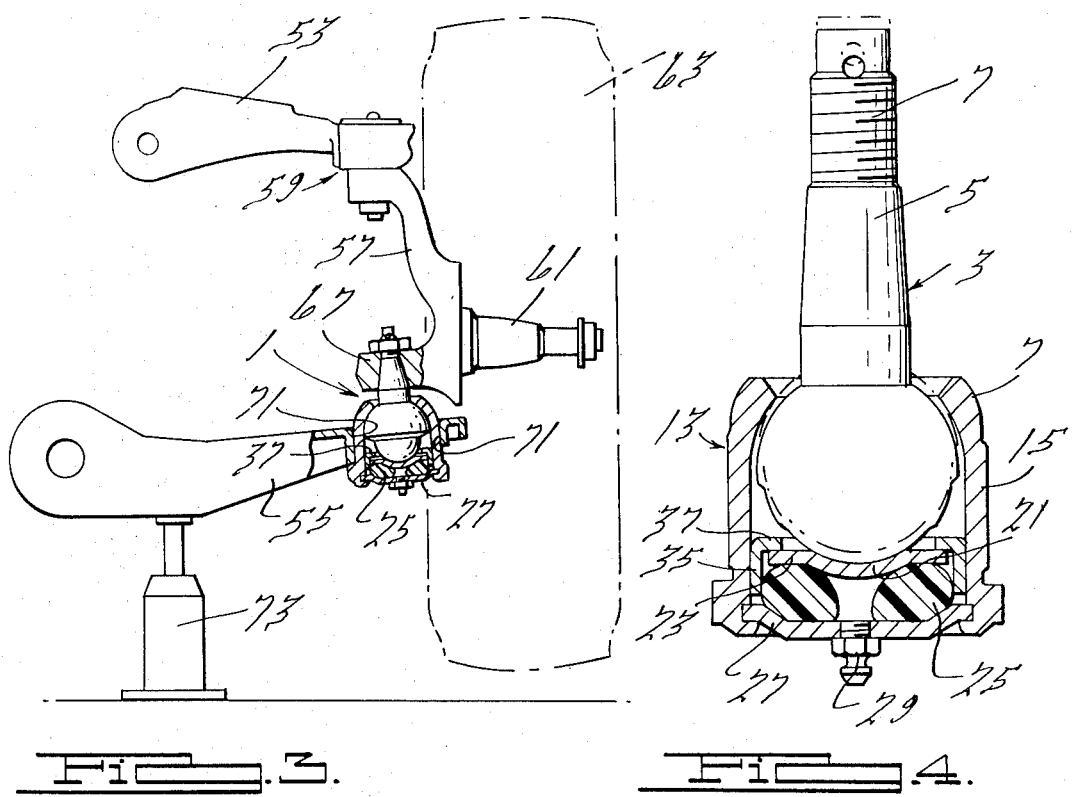

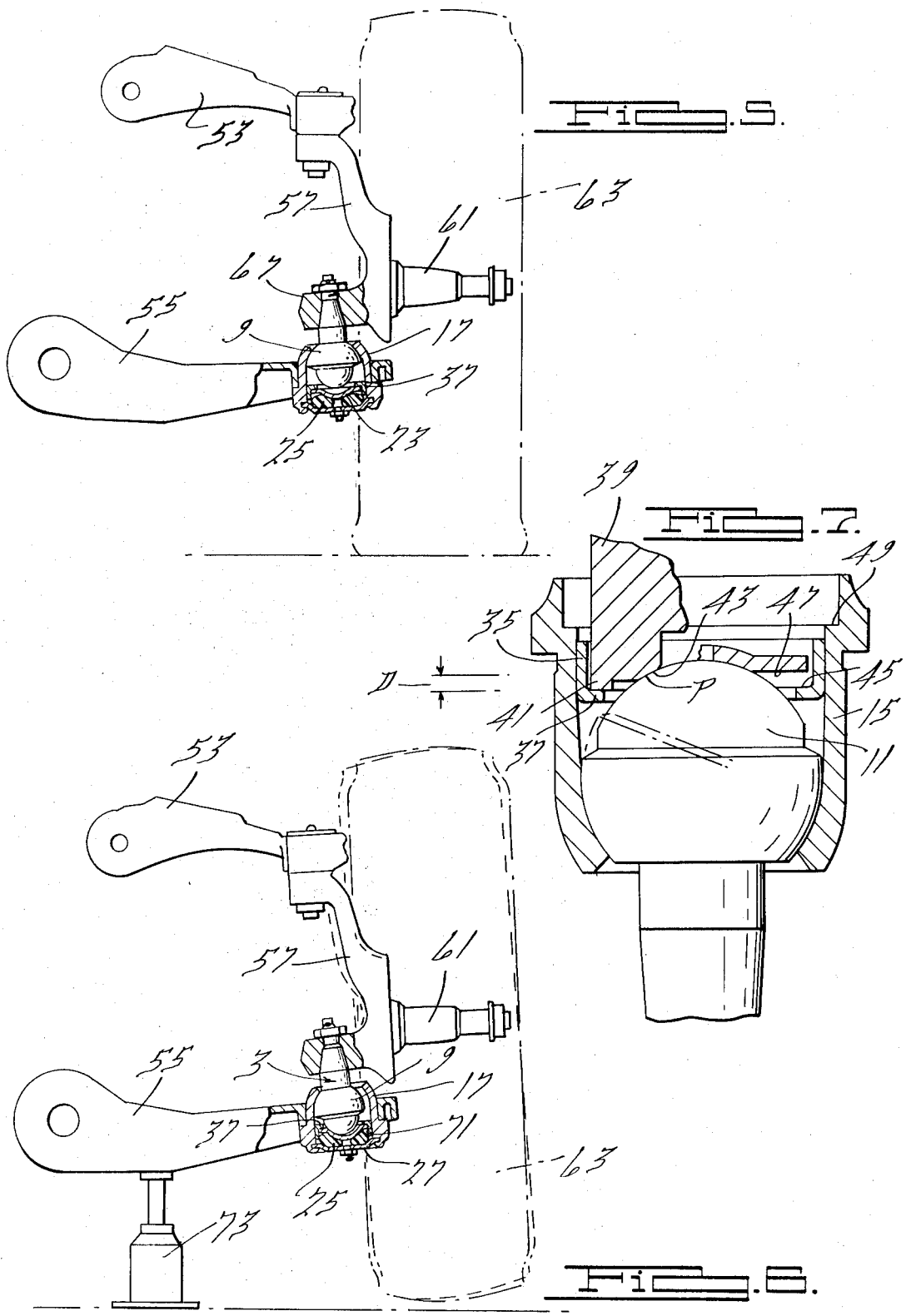

METHOD OF MAKING A BALL JOINT

This is a division of application Ser. No. 303,728 filed Nov. 6, 1972.

BACKGROUND OF THE INVENTION

This invention relates to ball joints, and more particularly, to a method of making ball joints of the type used in front suspension members of automotive vehicles.

Normally ball joints for automotive suspension systems are provided with one or more springs or other resilient means which provide a preload on the joint. This preload keeps the ball portion of the joint in contact with the socket as the ball wears, thereby preventing the joint from having a loose fit or developing "play." In many suspension applications, even though a certain amount of wear on the housing or socket has taken place, the joint is still very functional since the ball shank is under tension when the wheel is on the road and the ball is held against the socket. However, when an inspection of the suspension components is undertaken the vehicle is normally placed on a hoist in such a manner that the wheels are suspended from the vehicle, rather than the vehicle being suspended from the wheels. The wheel can be wobbled or shaken and the "play" of the ball joint will be noticeable.

In the past, some mechanics and garage operators would demonstrate the aforenoted play in the ball joints, and might convince customers that all joints which have play needed replacement. However, as noted above, even when jacked up, ball joints which are in excellent condition may have some play. It is only when the weight of the car is resting on them that they should not have any play.

Some ball joints have been spring loaded to eliminate the play therein even when the vehicle was placed on a hoist. However, since ball joints do wear, this made it difficult to tell when replacement was really necessary.

The present invention is directed to a method of making a ball joint which overcomes some of the difficulties of prior ball joints.

BRIEF SUMMARY OF THE INVENTION

Briefly, this invention comprises a method of making a preloaded ball joint having means to provide a positive indication when a predetermined amount of wear has taken place.

One of the primary objects of this invention is to provide a method of making a ball joint the condition of which may be simply and accurately determined without the necessity of special equipment or trained personnel.

Another object of this invention is to provide a method of making a ball joint which remains relatively tight until the housing and/or ball thereof have undergone sufficient wear that the joint should be replaced, in which case the joint will exhibit a noticeable degree of looseness or play.

A further object of this invention is to provide a method of making a ball joint such as described which will give a noticeable indication of when the ball joint should be replaced regardless of the normal accumulative variations or stack up of variations which occur when assembling several parts together.

Another object of this invention is to provide a method of making a ball joint which eliminates the guesswork or interpretation presently required in determining whether or not a ball joint is still functional or whether it would be advisable to replace the same.

A further object of this invention is to provide a method of making a ball joint of the type described which is economical in construction and effective in operation.

Other objects and advantages will be made apparent as the description progresses.

BRIEF DESCRIPTION OF THE DRAWINGS

In the accompanying drawings, in which one of various possible embodiments made by the method of this invention is shown, FIG. 1 is a vertical sectional view through a tension type ball joint showing the arrangement and relationship of the parts thereof when the ball joint is first assembled;

FIG. 2 is an elevational view of a wheel and suspension components therefor, showing a ball joint of this invention which is still functional, shown in section;

FIG. 3 is an elevational view similar to FIG. 2 showing the relationship of parts when the wheel and suspension components are in an unloaded condition and are raised off the ground for inspection;

FIG. 4 is a sectional view of a ball joint after the latter is worn to a point wherein replacement is advisable;

FIG. 5 is a view similar to FIG. 2 only showing the ball joint of FIG. 4 in a suspension system in a loaded condition;

FIG. 6 is a view similar to FIG. 3 showing the ball joint of FIG. 4 in an unloaded condition; and FIG. 7 is an enlarged fragmentary view showing one step in the method of setting a retainer used in this invention.

Like parts are shown by corresponding reference characters throughout the several views of the drawings.

DESCRIPTION OF THE PREFERRED EMBODIMENT

Referring now to the drawings, a ball joint made by the method of this invention is generally indicated at 1 in FIG. 1. It includes a stud 3 having a shank 5 threaded at one end 7 and a ball portion 8 having a first generally hemispherical portion 9 adjacent shank 5 and a second generally hemispherical portion 11 extending away from portion 9.

The stud 3, and more particularly the ball portion 8, is located within a socket or housing 13. The housing 13 has a cylindrical portion 15 merging into a socket or curved portion 17 which mates with hemispherical portion 9. Socket portion 17 has an opening 19 therein through which shank 5 and the adjacent portion of hemispherical portion 9 extend.

The hemispherical portion 11 is seated on a dished portion 21 of a pressure plate 23 which is biased toward the stud by a preload resilient and compressed ring 25. Ring 25 may be made of rubber or other suitable resilient material. Alternatively, the preload means could be a conventional spring, such as a coil or Belleville. A cap 27 closes the housing 13 and backs up the resilient ring 25. The cap or closure plate 27 has a lubrication fitting 29 at the outer thereof and is held in place by a crimp 31 spun from the end of the housing 13.

A preload limiter or pressure plate retainer 33 is pressed into the cylindrical portion 15. It includes an annular ring portion 35 and a radially inwardly extending flange 37. As shown in FIG. 1, the flange 37 is spaced from the pressure plate 23 by a certain distance. As will be made apparent, this certain distance is predetermined when the ball joint is assembled.

The method of positioning the pressure plate retainer 33 is shown in FIG. 7. During the assembly of the joint the stud 3 is inserted through the opening 19 in the socket 13 until spherical portion 11 seats in the socket portion 17. The retainer 33 is then inserted into the cylindrical portion 15. A positioning arbor 39 has a first annular ring portion 41 having a diameter slightly smaller than the internal diameter of cylindrical portion 35. Spaced inwardly from the ring 41 is an annular spherical segment 43 adapted to mate with a portion of the hemispherical portion 11 of the stud 3. Some point P on the spherical segment 43 is a predetermined distance, in an axial direction, from the surface 45 of flange 37, this predetermined distance being indentified by D in FIG. 7 and being the desired distance which the face 47 of plate 23 should originally be from surface 45. In other words, the distance D represents the amount of wear which is permissible before replacement of the joint is recommended. This distance should be such that there is considerably more life left in the joint when the joint has worn this amount.

The arbor 39 is moved toward hemispherical portion 11. The ring 41 engages the flange 37 and forces the retainer 33 inwardly with the cylindrical portion 35 having a press fit with portion 15 of housing 13. If desired, the retainer may be secured, as by welding, at its predetermined position. When the spherical segment 43 engages the portion 11 and the portion 9 is seated in the socket section 17, the point P lies in a plane which is the distance D away from the parallel plane in which surface 45 lies. The arbor 39 is then withdrawn and the pressure plate 23 placed in position. The preload ring 25 is then placed on the plate 23 and the cap 27 placed on the ring. Pressure is applied to the cap to compress ring 25 until the cap is seated on shoulder 49 of the housing 13. The housing is then spin crimped to hold the cap 27 in place. The compression of ring 25 is sufficient to cause the plate 23 to move into engagement with the flange 37 if unopposed by the stud 3, i.e., the difference between free uncompressed height of the ring and the compressed height thereof is greater than the distance D. In addition, the ring 25 must have sufficient biasing capacity to support the wheel and its supporting assemblies, i.e., to keep the spherical portion 9 seated in socket 17 when the lower control arm is lifted by a hoist as made apparent hereafter.

When the joint is assembled it has the appearance shown in FIG. 1. The ball joint of FIG. 1 is shown in a suspension assembly 51 in FIG. 2. The assembly 51 includes an upper control arm 53 and a lower control arm 55 connected to a steering knuckle 57 by a ball joint 59 and the ball joint 1, respectively. The knuckle 57 has a spindle 61 on which a wheel 63 is mounted in a conventional manner.

A shank 5 extends upwardly through a tapered hole 65 in a boss 67 on knuckle 57. A nut 69 is secured to the threaded end 7 of shank 5 for connecting the ball joint to the knuckle. The housing 13 extends through an opening 71 in the lower control arm 53 and is secured to the latter in a conventional manner.

As shown in FIG. 1, the hemispherical portion 9 is seated in socket portion 17 and the pressure plate 23 is in engagement with the hemispherical portion 11 when the wheel 63 is on the ground. The shank 5 is in tension. If a jack or hoist 73 is used to lift the vehicle such as by lifting the lower control arm 53, the wheel 63 then becomes supported by the control arms. The shank 5 of ball joint 1 is placed in compression. When the ball joint is new the preload ring 25 keeps the portion 9 seated in socket 17 and the joint will remain tight, even when a mechanic shakes or tries to wobble the wheel.

As the socket 17 and the hemispherical portion 9 wear during use the stud 3 moves upwardly relative to the housing 13. As it gradually moves upwardly the resilient ring 25 expands from its original compressed condition and keeps the portion 9 in engagement with socket 17, thus maintaining the effectiveness of the joint.

As long as pressure plate 23 is not in contact with the flange 37 of the retainer 33, the joint will be tight even when the vehicle is hoisted and a mechanic attempts to shake or wobble the wheel. However, if the wear on the hemispherical or socket portion has exceeded a predetermined amount, the pressure plate 23 will be prevented, by its engagement with flange 37, from biasing the portion 9 into engagement with socket 17. However, when the wheel 63 is on the ground the tension on the stud 3 keeps the portion 9 in engagement with the socket 17, as shown in FIG. 5.

If the vehicle is hoisted when the ball joint has worn the amount shown in FIG. 5, the portion 9 will move away from the socket 17 since the pressure plate 23 is retained by flange 37. Thus, when a mechanic shakes the wheel 63, the ball joint will exhibit a looseness which is readily detected. Although the joint may still be capable of performing satisfactorily for many more miles, this positive signal of being loose indicates the advisability of replacing this ball joint.

It will be seen that guesswork is eliminated from making a judgment as to a determination of the amount of wear on the ball joints. If the joint is tight when the vehicle is hoisted and the wheel is shook, the ball joint is still within predetermined wear limits. If it is loose it has exceeded a predetermined amount of wear and should be replaced.

Moreover, during the assembly operation many slight variations in dimensions, such as differences in the diameters of the ball portions, are overcome and obviated because the arbor 39 locates the face or surface 45 with respect to the face 47, thus determining the amount of permissible wear. Slight differences in the resiliency of the ring 25 have no effect on the operation of the joint as long as the rings are still under sufficient compression even when plate 23 engages flange 37.

In view of the foregoing it will be seen that the several objects of this invention are achieved.

Although only one embodiment of the invention has been disclosed and described, it is apparent that other embodiments and modifications of the invention are possible.

I claim:

1. A method of making a ball joint comprising the steps of placing a stud having a ball portion through an opening in a housing having a socket, forcing the ball portion of said stud to seat in said socket and placing a retainer in said housing with a radially extending portion thereof a predetermined distance from a specified point on the ball portion, placing a pressure plate against said ball portion with one face thereof being said predetermined distance from said radially extending portion and resiliently holding said pressure plate against said ball portion while forming a closure in the housing.

2. A method of making a ball joint as set forth in claim 1 wherein said pressure plate is resiliently held against said ball portion by placing a resilient member thereon, compressing the resilient member with a cap, and the formation of said closure includes spin flanging a portion of said housing against said cap.

* * * * *